United States Patent [19]
Ackley et al.

[11] Patent Number: 5,834,760
[45] Date of Patent: Nov. 10, 1998

[54] METHOD OF ADJUSTING DEPTH-OF-FIELD IN LASER SCANNERS BY DYNAMICALLY ADJUSTING LASER POWER

[75] Inventors: H. Sprague Ackley, Seattle, Wash.; Paul S. Swanson, Colorado Springs, Colo.

[73] Assignee: Intermec Corporation, Everett, Wash.

[21] Appl. No.: 581,828

[22] Filed: Jan. 2, 1996

[51] Int. Cl.⁶ .................................. G01J 1/32; H01S 3/10
[52] U.S. Cl. .................................. 250/205; 372/29; 372/38
[58] Field of Search ........................ 250/205, 552, 250/234, 235; 235/454, 455, 462, 468, 470, 472; 372/9, 24, 26, 29, 31, 38

[56] References Cited

U.S. PATENT DOCUMENTS

| | | | |
|---|---|---|---|
| 3,631,250 | 12/1971 | Van Baskirk | 250/205 |
| 4,970,379 | 11/1990 | Danstrom | 250/205 |
| 5,469,089 | 11/1995 | Rothermel et al. | 327/56 |
| 5,528,022 | 6/1996 | Nakazawa | 250/205 |
| 5,581,068 | 12/1996 | Shepard et al. | 250/237 R |
| 5,600,125 | 2/1997 | Poorman et al. | 250/205 |
| 5,602,861 | 2/1997 | Kawai et al. | 250/205 |
| 5,621,205 | 4/1997 | Warner et al. | 250/205 |
| 5,635,704 | 6/1997 | Del Signore, II et al. | 250/205 |

*Primary Examiner*—Edward P. Westin
*Assistant Examiner*—John R. Lee
*Attorney, Agent, or Firm*—Seed and Berry LLP

[57] ABSTRACT

Methods of controlling the power level of a pulsed laser beam being used to scan barcodes and the like in order to increase the depth-of-field. The pulses may comprise a plurality of pulses above and below a maximum legal power level so that, on average, the power output is below the legal limit. The sensor may be monitored for no-signal and over-signal conditions and the power of the laser beam adjusted accordingly.

7 Claims, 7 Drawing Sheets

METHOD OF ADJUSTING DEPTH-OF-FIELD IN LASER SCANNERS BY DYNAMICALLY ADJUSTING LASER POWER

BACKGROUND OF THE INVENTION

1. Technical Field

This invention relates to scanners employing a laser beam to scan a field of interest and, more particularly, to scanning a field of interest outside the normal depth-of-field of a scanner.

2. Background Art

Figure 1:
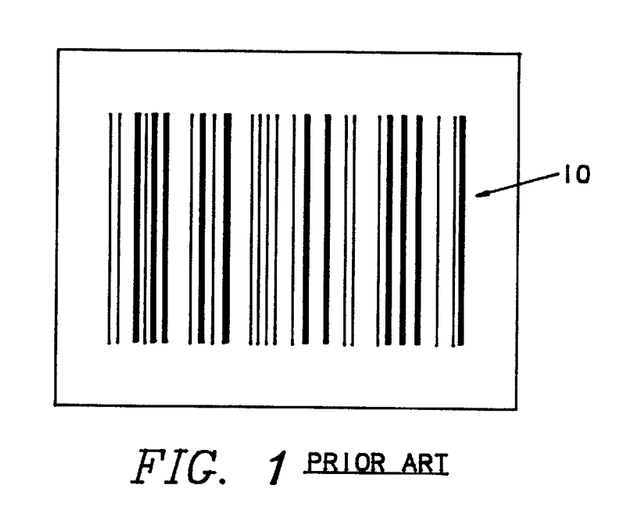
FIG. 1 is a simplified drawing of a one-dimensional bar code as can be scanned by a laser scanner.
Figure 2:
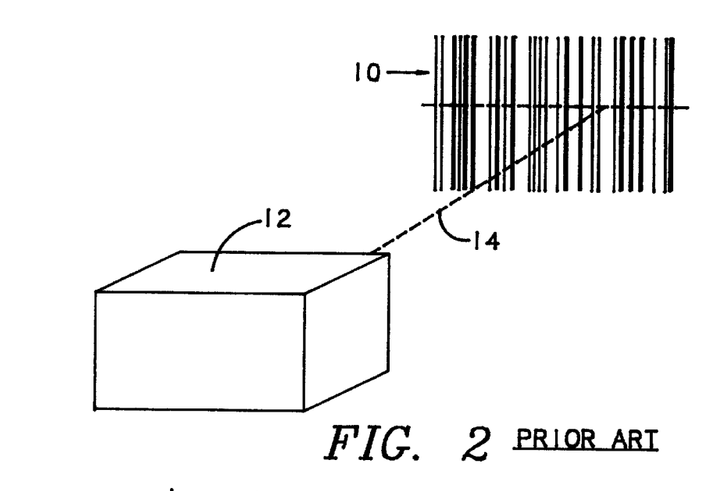
FIG. 2 is a simplified drawing of the bar code of FIG. 1 being scanned by a laser scanner.
Figure 3:
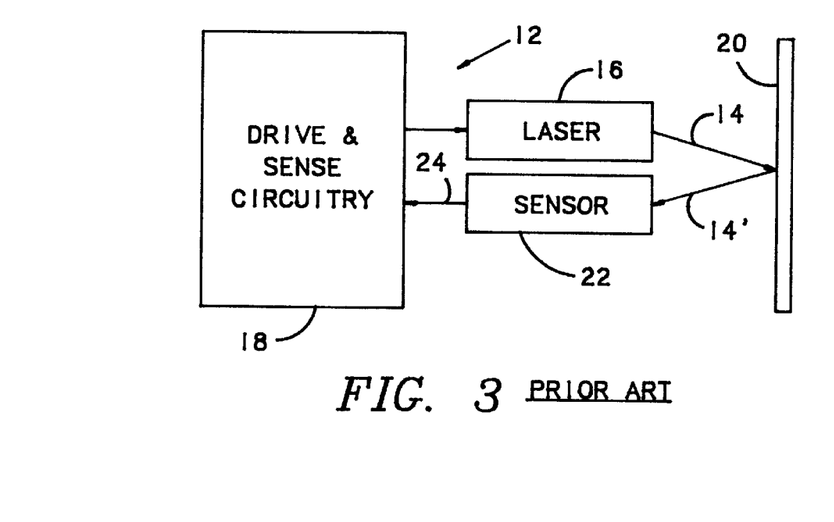
FIG. 3 is a simplified functional block diagram of a typical prior art laser scanner.

One-dimensional bar codes such as the bar code 10 of FIG. 1 are well known in the art. Such bar codes appear on products and labels of all kinds. As a consequence, the products and labels can be read automatically by scanning equipment such as that depicted in FIG. 2. The scanner 12 reads the bar code 10 by scanning a laser beam 14 across the bar code 10 at any point. More particularly, the scanner 12 is constructed as depicted in FIG. 3. The laser 16 is stimulated by power from the drive & sense circuitry 18 to emit the laser beam 14 in a scanning action across the surface 20 containing the bar code 10. The manner in which the scanning sweep of the laser beam 14 is produced is unimportant to the present invention and, therefore, it will not be addressed herein in any detail in the interest of simplicity and the avoidance of redundancy. Typically, it is done with a pivoting mirror, or the like; but, other techniques known to those of ordinary skill in the art have been used. The factor of importance herein is the power of the laser beam 14, which is determined by the drive & sense circuitry 18.

The laser beam 14 is reflected and absorbed on a time-related basis during the scanning of the bar code 10 by the light and dark bands comprising the bar code 10. The reflected laser beam 14' is sensed by a sensor 22 which produces an electrical signal on its output 24 which is then input to the drive & sense circuitry 18. The drive & sense circuitry 18 is then able to employ the time-based signal which reflects the structure of the bar code 10 to interpret the data encoded into the bar code 10.

Figure 4:
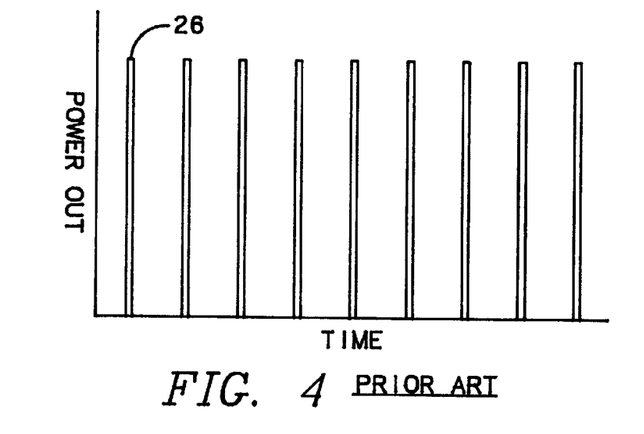
FIG. 4 is a simplified graph of the laser pulses emitted by the scanner of FIG. 3.
Figures 5, 6:
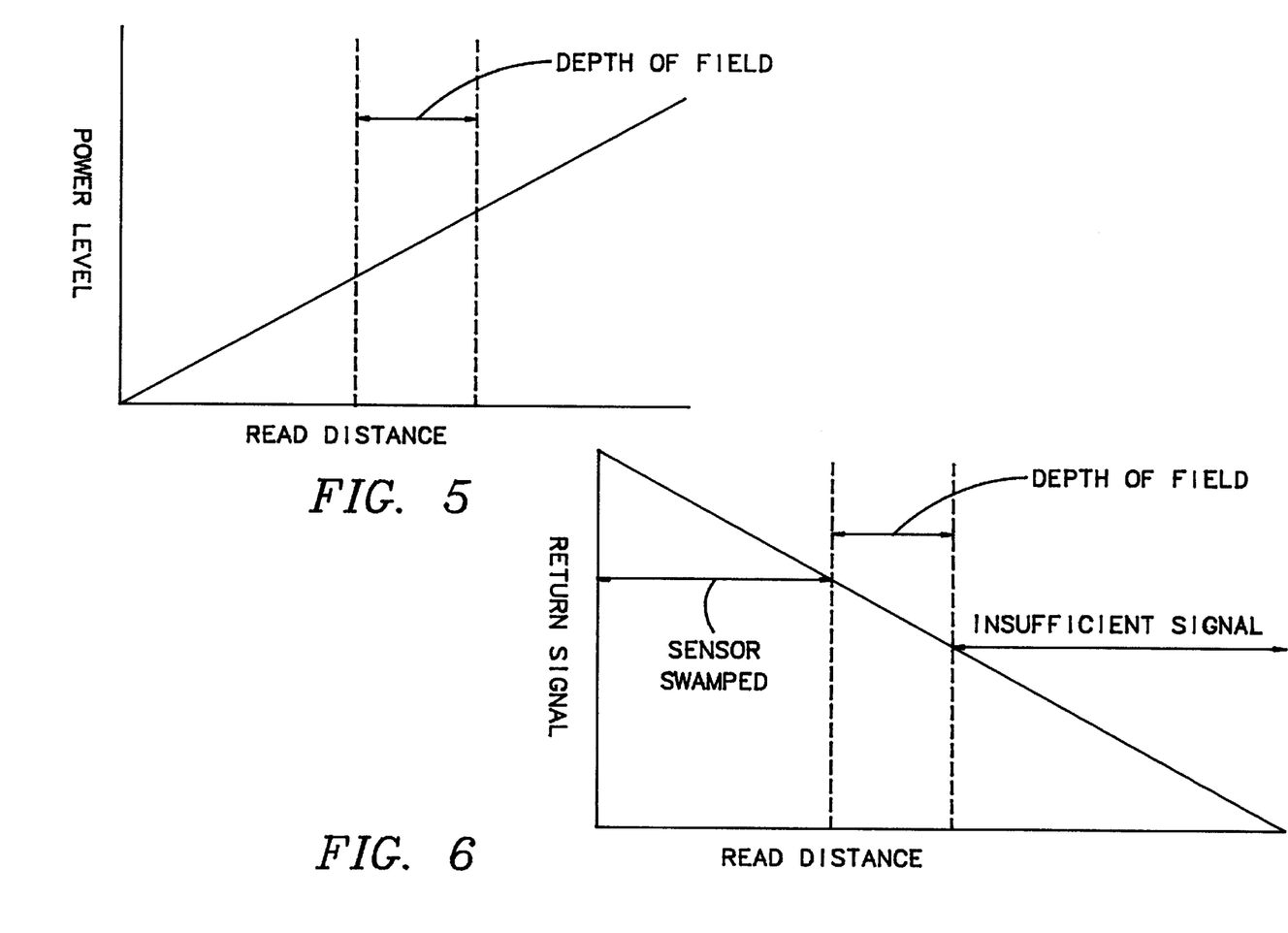
FIG. 5 is a chart of laser power level versus read distance for a laser barcode scanner.
FIG. 6 is a chart of return signal level versus read distance for a laser barcode scanner operating at a fixed power level.

Typically in the prior art, the laser beam 14 is produced as a series of scanned pulses 26 as depicted in FIG. 4. Each of the pulses 26 is of a fixed power magnitude which is below the power output limit established by law for such devices. With a fixed scanner such as used in supermarkets where the products are slid over a window at a constant distance from the laser 16 and sensor 22, depth-of-field is not a problem. The window is placed at the optimum distance from the laser 16 and sensor 22. Thus, an optimum signal is almost always created.

Where the scanner 12 is a hand-held or similar scanner, it is a different story. Depth-of-field becomes a real problem. Typically, the depth-of-field for a hand laser scanner 12 operating according to prior art techniques is about four to twelve inches. That is, the scanner 12 must be positioned so that the bar code 10 is within a four to twelve inch depth-of-field. If a scanner is operated beyond its normal depth-of-field, one of two problems can occur. If the scanner 12 is held too close, the laser beam 14' as reflected is too strong for the sensor 22. The sensor 22 is swamped and produces no usable signal output. On the other hand, if the scanner 12 is held too far away, the laser beam 14 striking the bar code is too weak to cause a readable reflected beam 14' at the sensor 22. This is set forth in FIGS. 5 and 6. In FIG. 5 we see that there is a depth-of-field at some distance associated with the power level of the scanning laser beam. The weaker the power, the closer the scanner must be to the scanned object. In FIG. 6, we see that for a fixed power level, when too close the sensor is swamped and when too far there is insufficient signal.

As can be appreciated, persons using a hand-held scanner 12 wish to simply point the scanner 12 at the bar code 10 and have it read without having to try to position the scanner 12 within a narrow depth-of-field before a successful read will take place. Thus, there have been various attempts to increase the depth-of-field by working with the automatic gain control at the amplifiers within the drive & sense circuitry reading the output 24 from the sensor 22. This approach is prone to several problems. When the scanner 12 is too close and the sensor 22 is swamped, adjusting the gain of the amplifiers processing the signal from the output 24 is useless. Once the sensor 22 is optically swamped, the output 24 is meaningless and a meaningless signal cannot be corrected by either amplification or attenuation. At the opposite end of the spectrum, grossly amplifying the output 24 cannot do more than increase a weak signal. It cannot create a signal where one does not exist. Moreover, when amplifiers are increased toward their maximum amplification level, the signal-to-noise ratio becomes a real problem.

Wherefore, it is an object of this invention to provide a method for controlling a laser scanner which will increase the depth-of-field.

It is another object of this invention to provide a method for controlling a laser scanner which will resist swamping of the sensor when the scanner is held close to the item being scanned.

It is still another object of this invention to provide a method for controlling a laser scanner which will increase the power of the scanning laser beam when the scanner is held too far from the item being scanned to produce a usable signal at normal power levels.

It is yet another object of this invention to provide a method for controlling a laser scanner and increase the power of the scanning laser beam so as to obtain a usable signal without exceeding power limits allowed by law.

Other objects and benefits of this invention will become apparent from the description which follows hereinafter when read in conjunction with the drawing figures which accompany it.

SUMMARY

The foregoing objects have been achieved by the method of controlling power to the laser of a laser scanner comprising a laser outputting a variable power or pulsed laser beam and a sensor receiving reflected portions of the pulsed laser beam and outputting a signal of interest related to the strength of the received reflected portions comprising the steps of, continually testing the signal of interest for a no-signal condition resulting from not enough light striking the sensor; when a no-signal condition is detected, increasing power to the laser; continually testing the signal of interest for a sensor-swamped condition resulting from too much light striking the sensor; and, when a sensor-swamped condition is detected, reducing power to the laser.

The preferred embodiment additionally comprises the steps of, increasing power to the laser in a step function less than a maximum possible power increase; re-testing the signal of interest for a no-signal condition; and, returning to the first step if a no-signal condition still exists.

It also includes, continually calculating the average power output of the laser; and, outputting lower power laser pulses along with high power laser pulses as necessary to maintain a short-term average power output which is within legal power output limits.

It also additionally comprises the steps of, reducing power to the laser in a step function less than a maximum possible power reduction; re-testing the signal of interest for a sensor-swamped condition; and, returning to the first step if a sensor-swamped condition still exists.

The foregoing objects have also been achieved by the method of controlling power to the laser of a laser scanner comprising a laser outputting a pulsed laser beam and a sensor receiving reflected portions of the pulsed laser beam and outputting a signal of interest related to the strength of the received reflected portions comprising the step of continuously cycling the power level of pulses comprising the pulsed laser beam between minimum and maximum power levels.

In the preferred embodiment, the step further comprises continuously cycling the power level of pulses comprising the pulsed laser beam between minimum and maximum power levels which, on-average, are not above a legal power limit. Typically, this comprises continuously outputting a first plurality of pulses comprising the pulsed laser beam below the legal power limit and a second plurality of pulses comprising the pulsed laser beam above the legal power limit so that, on-average, the pulsed laser beam is not above a legal power limit.

The preferred embodiment also includes returning the pulses to the minimum power level when a successful signal of interest has been output by the sensor. It further includes the steps of monitoring the average power level of pulses comprising the pulsed laser beam; and, returning the pulses to the minimum power level when the average power level is at the legal power limit. Preferably, it also includes skipping pulses until the average power level is below the legal power limit when the power level of pulses being output is below the maximum power level.

DESCRIPTION OF THE PREFERRED EMBODIMENT

Figure 7:
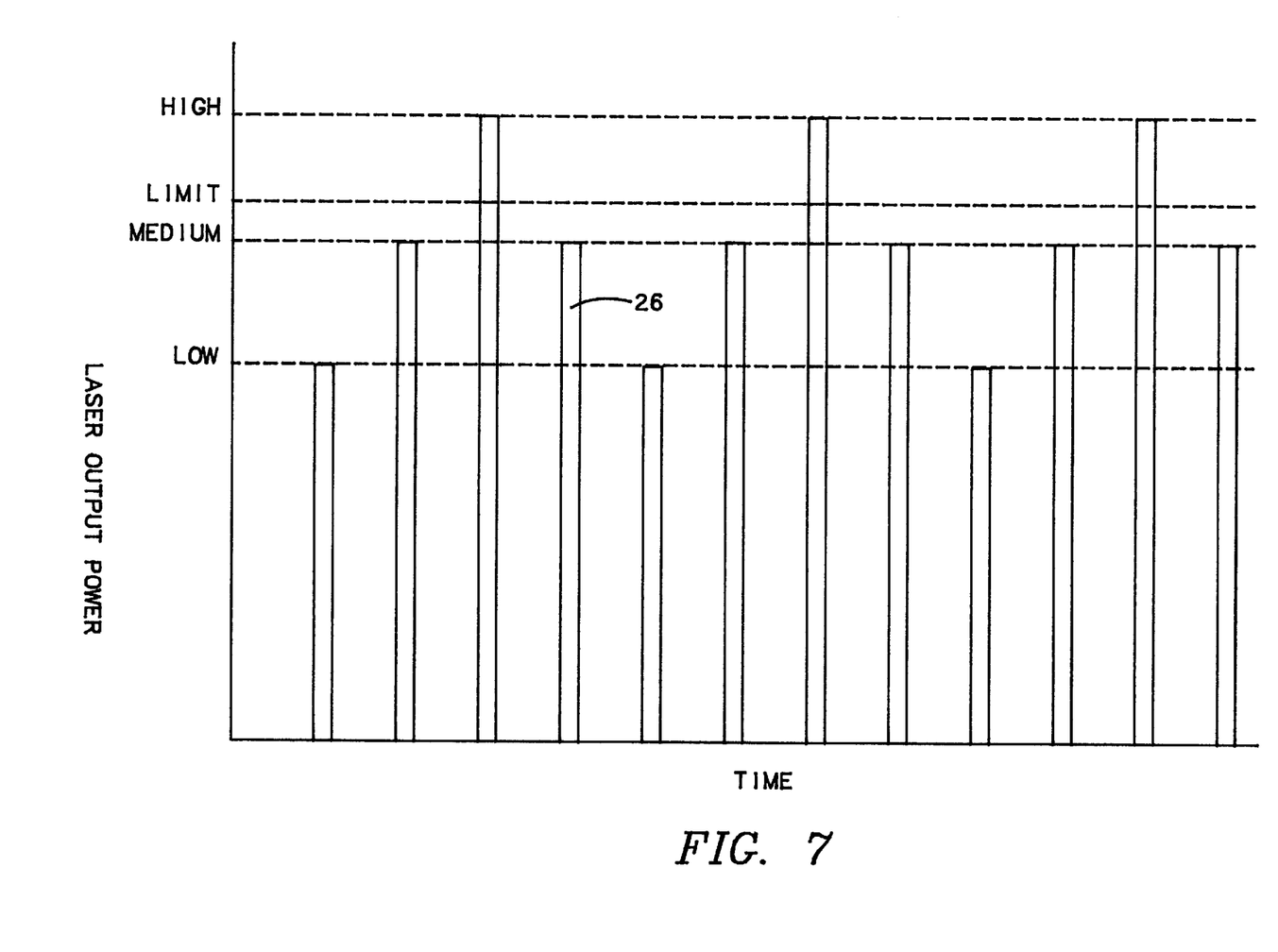
FIG. 7 is a detailed graph of the laser pulses emitted by a scanner operating according to the present invention in a preferred embodiment.

A graph of representative laser outputs by power level when practicing the present invention in its preferred embodiment is depicted in FIG. 7. That is, in practicing the present invention of FIG. 3 contains additional logic which pulses the laser 16 as depicted in FIG. 7.

As will be recognized immediately, the present invention obtains its objectives by changing the power level of the laser 16 rather than changing amplifier gain as in the prior art. Moreover, the power level of the laser 16 is fluctuated above and below the limit level so that on average, the power of the laser 16 is at or below the limit level as set by the governmental regulating agency for such devices.

In implementing the present invention according to the various embodiments described herein, the objective is to have the laser 16 output an average power over short-term periods of scanning which is within the power limits set by law. That is, it is not illegal to output a burst of laser pulses which is above the legal power limit as long as the average power over a short run period wherein damage could result is within the legal limit. The primary users' criteria impose on scanner design is that the barcode be read in less than a second. Thus, the various fluctuations in power level employed by the present invention should take place in less than a second in virtually all cases. If the laser 16 is being pulsed at thirty times a second, then there can be any mix of pulse levels during the thirty pulses which occur each second as long as, on average, they are within allowed power limits.

The implementation of FIG. 7 is preferred merely because it is simple and straightforward. The laser 16 is pulsed by the logic of the drive & sense circuitry 18 in a sinusoidal fashion with as many pulses 26 below the limit level as above. While three levels of pulses 26 at low, medium and high levels are shown in the drawing, those of ordinary skill in the art will readily recognize and appreciate that more and different pulse levels could be employed to achieve the objects of the present invention and within its general scope and spirit. No checking is made for when a valid read of the barcode is made. When it occurs, the drive & sense circuitry 18 simply processes the signal in the normal manner.

Figure 8:
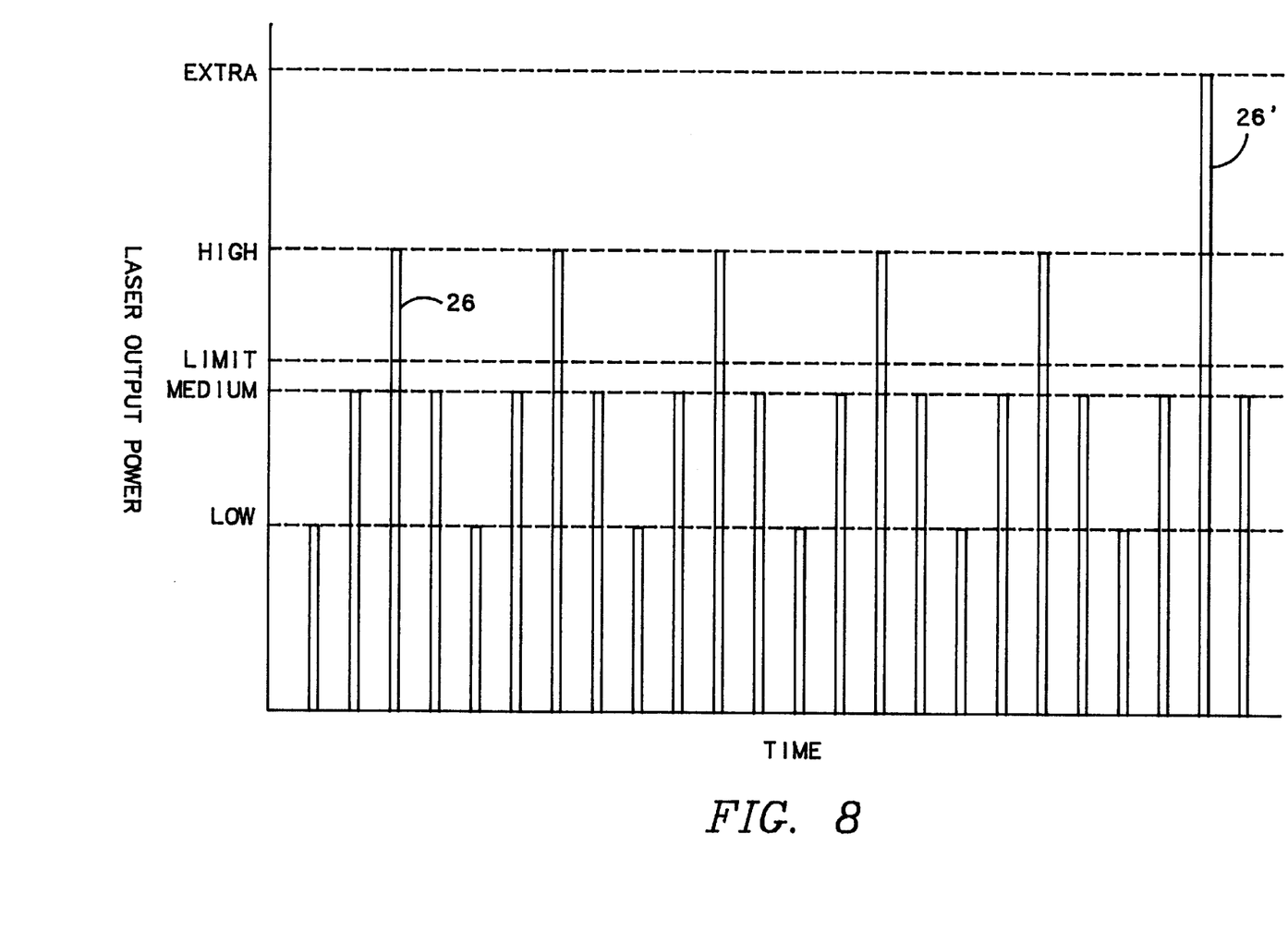
FIG. 8 is a detailed graph of the laser pulses emitted by a scanner operating according to the present invention in an addition to the preferred embodiment which extends the depth-of-field even further.

A slight modification to the implementation of FIG. 7 is depicted in FIG. 8. In this case, every once in a while an extra-high energy pulse 26' is emitted by the drive & sense circuitry 18. This gives an even further reach to the depth-of-field at the expense of the under-one-second criteria mentioned earlier. And, by only happening at extended times, the on-average power level is not greatly increased.

Figure 9:
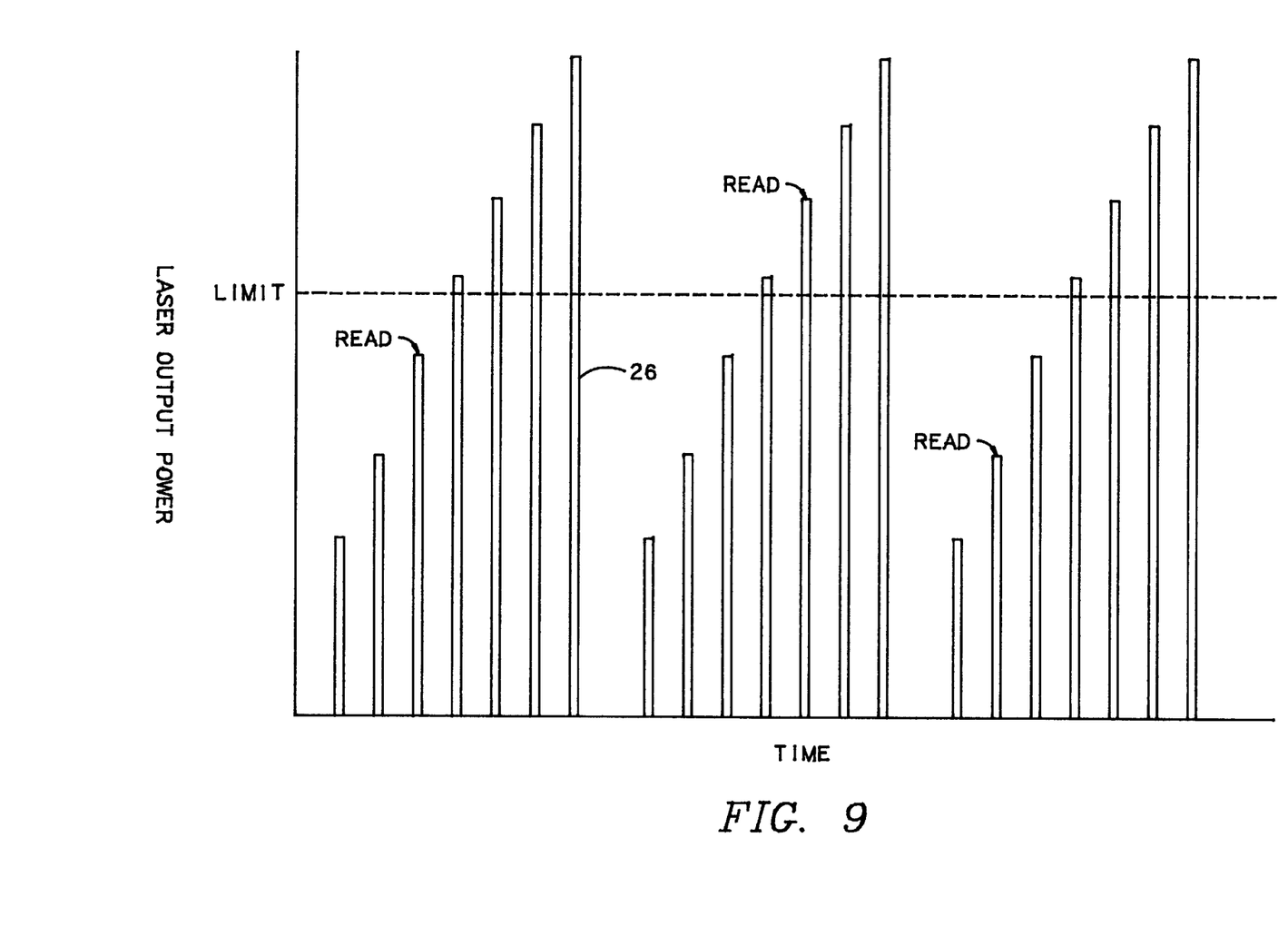
FIG. 9 is a detailed graph of the laser pulses emitted by a scanner operating according to the present invention in a preferred embodiment according to another implementation.

Still another variation on the general approach of FIG. 7 is shown in FIG. 9. In this case, the pulses 26 cycle from low to high and then begin again at the lowest level. Again, there is no monitoring of when a successful read takes place and the entire pulse cycle is repeated over and over.

Figure 10:
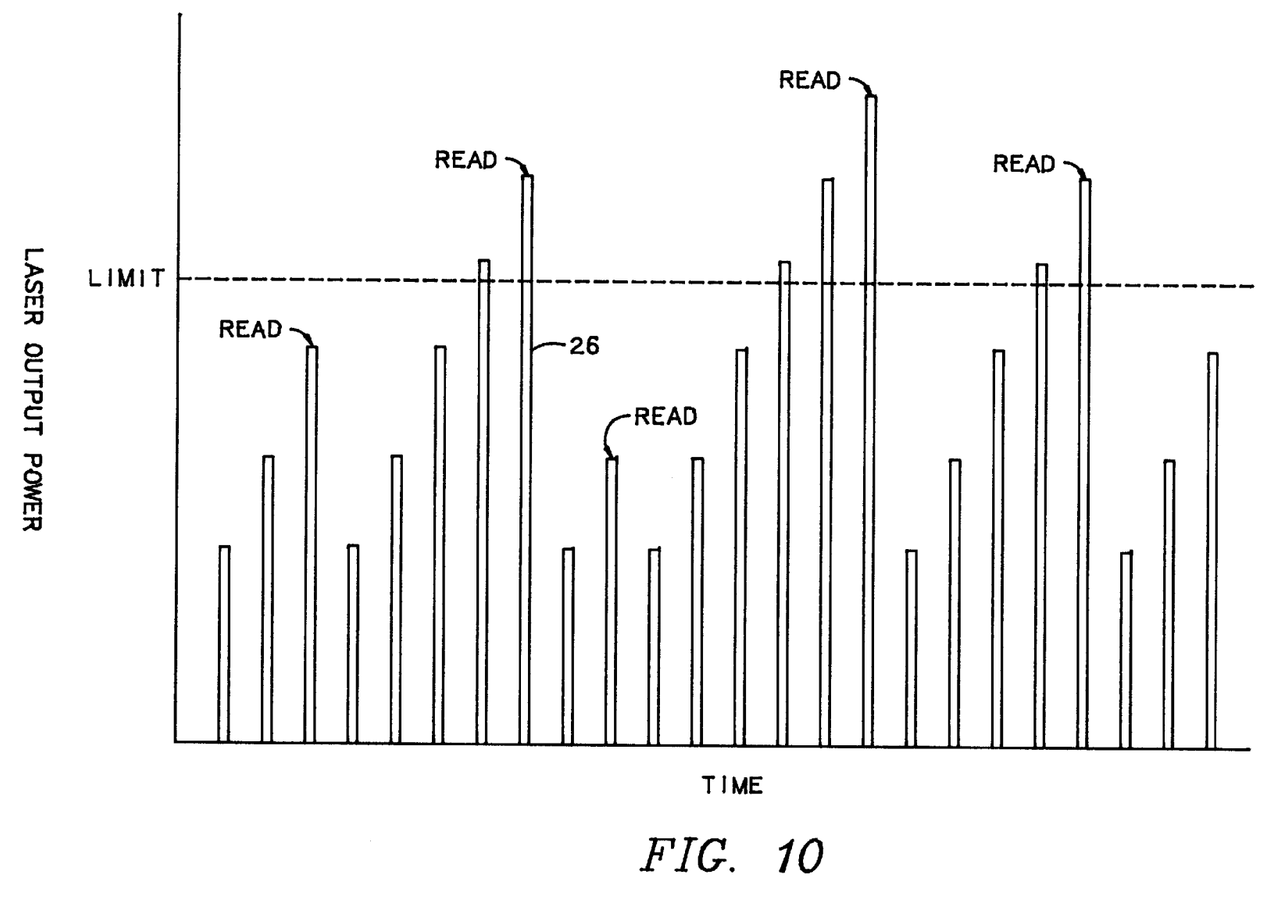
FIG. 10 is a detailed graph of the laser pulses emitted by a scanner operating according to the present invention in a preferred embodiment according to still another implementation.
Figures 11, 12:
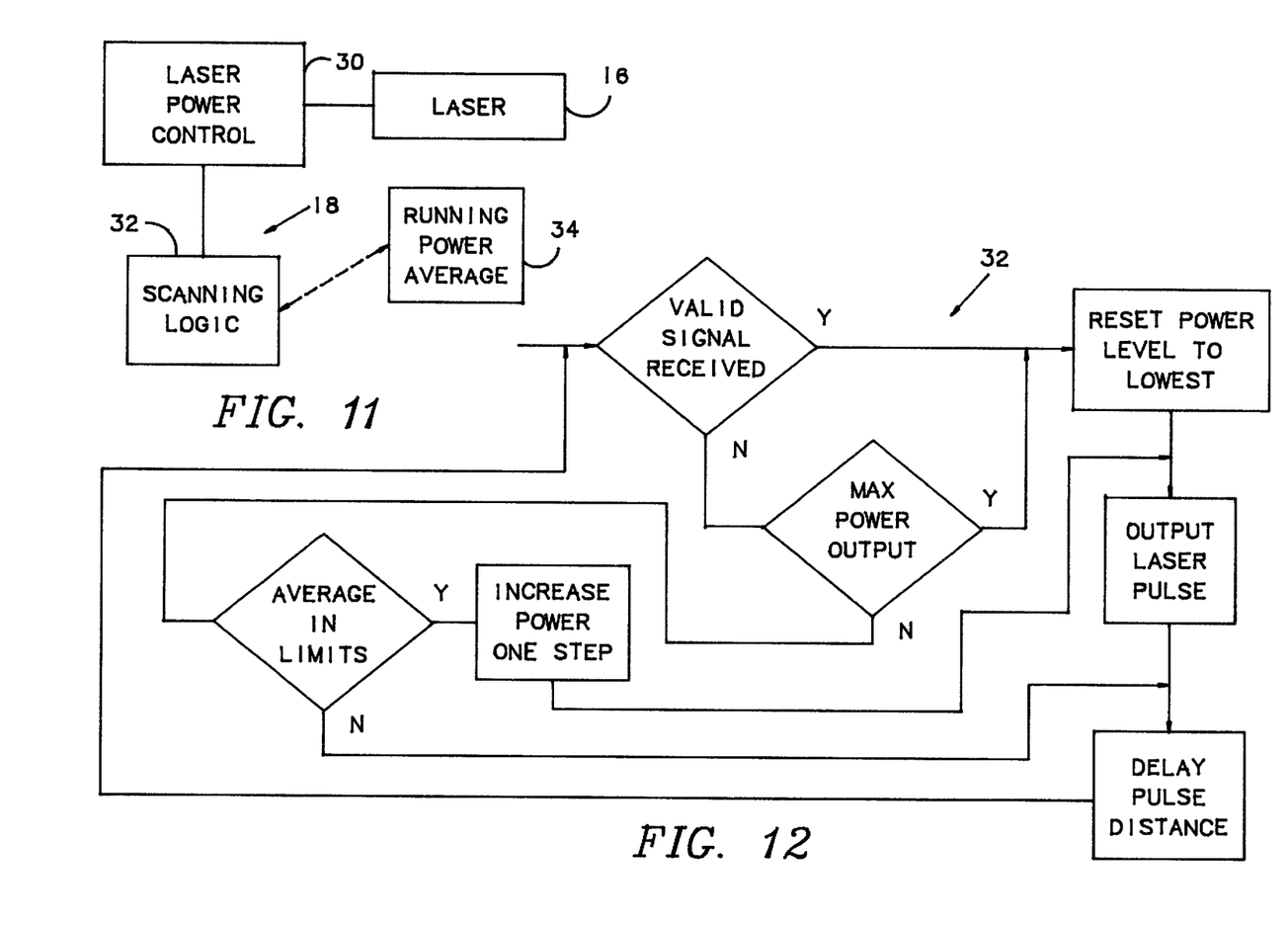
FIG. 11 is a simplified functional block diagram of scanning apparatus for implementing the laser pulse pattern of FIG. 10.
FIG. 12 is a flowchart of exemplary logic for implementing the laser pulse pattern of FIG. 10.

A more complex approach to the present invention is depicted in FIGS. 10 through 12. The pulse pattern produced is depicted in FIG. 10. The apparatus is depicted in simplified form in FIG. 11 and exemplary logic is shown in flowchart form in FIG. 12. The major difference in this approach is that while a pulse pattern as shown in FIG. 9 is used, a successful read causes the pattern to be reset to its lowest level. There are several benefits to this approach. For one, the total power consumed will, in general, be lower since all the pulses in the possible sequence are not always emitted. For another, the depth-of-field may be extended since the on-average power level will be lower so that occasional extended power sequences can be employed to obtain a successful read without exceeding the power limit.

In this embodiment, the drive & sense circuitry 18 includes laser power control circuitry 30 connected to the laser 16 and controlled by scanning logic 32. The scanning logic 32 maintains a running power average 34 in memory. This is simply the time average over the period of interest for all the pulses 26 that have been output. The period of interest is set by the applicable regulating authority and the power level and duration of the pulses 26 during the period of interest are known to the logic 32 since it caused them to be output. As can be seen from the logic flowchart of FIG. 12, the logic 32 includes a loop which is entered after each pulse 26 is output and first checks to see if a valid signal has been received; that is, if a signal was received as a result of the last pulse 26 output which resulted in a successful read of the barcode being scanned. When a valid signal is received, the logic 32 resets the power level of the pulses 26 being output to their lowest level as depicted in FIG. 10. If no valid signal is received, the logic 32 checks to see if the last pulse 26 was at the maximum power output for the laser 16. If it was, the logic 32 takes the same path which results in the power level being reset to its lowest level. If there is still an increase in power level remaining, the logic 32 checks the running power average 34 to see if it is within limits. If it is not, the logic 32 branches to a point where a delay occurs between pulses 26 being output. In virtually all low-cost lasers as employed in commercial equipment, the lasers are pulsed or "lazed" at spaced times sufficient to allow the power level of the laser to build up. In taking that path in this case, the logic 32 essentially skips a pulse 32 thereby causing the running power average 34 to be reduced. It will stay in that sub-loop until the running power average 34 is within limits. At that point, the power level of the laser 16 is increased one step and a laser output pulse 26 is caused by the logic 32.

While not a preferred approach because it requires more complex signal processing, the present invention could also monitor the signal 14' being received by the sensor 22 and modify the signal 14 being output by the laser 16 as a function thereof. Thus, in simplest terms, if there is an insufficient signal 14' being reflected, the power level of the pulses 26 comprising the signal 14 is, in total, increased by steps until a signal 14' resulting in a successful read is sensed. And, on the opposite side of the power spectrum, if the signal 14' being reflected is causing swamping of the sensor 22, the power level of the pulses 26 comprising the signal 14 is, in total, decreased by steps until a signal 14' resulting in a successful read is sensed. And, as with the other embodiments of the present invention, the overall running average power being output by the laser 16 should be monitored to assure that the average power is not exceeded. This can be accomplished by mixing lower power pulses with higher power pulses or by skipping pulses as necessary to drive the average power back within limits.

Thus, it can be seen that by adjusting the power level to the laser up or down as necessary and by monitoring and controlling the laser power at upper power levels to assure an average power output that is within legal limits, the useful range of a hand-held laser scanner, or the like, can be greatly increased and problems of sensor swamping can be virtually eliminated.

Wherefore, having thus described the present invention, what is claimed is:

1. A method of controlling power to the laser of a laser scanner comprising a laser outputting a pulsed laser beam and a sensor receiving reflected portions of the pulsed laser beam and outputting a signal of interest related to the strength of the received reflected portions comprising the steps of:

continually testing the signal of interest for a sensor-swamped condition resulting from too much light striking the sensor;

when a sensor-swamped condition is detected, reducing power to the laser in a step function less than a maximum possible power reduction;

continually calculating the average power output of the laser; and, outputting lower power laser pulses along with high power laser pulses as necessary to maintain a short-term average power output which is within a defined power output limit.

2. A method of controlling power to the laser of a laser scanner comprising a laser outputting a pulsed laser beam and a sensor receiving reflected portions of the pulsed laser beam and outputting a signal of interest related to the strength of the received reflected portions comprising the steps of:

continually testing the signal of interest for a no-signal condition resulting from not enough light striking the sensor;

when a no-signal condition is detected, increasing power to the laser in a step function less than a maximum possible power increase;

continually calculating the average power output of the laser; and, outputting lower power laser pulses along with high power laser pulses as necessary to maintain a short-term average power output which is within a defined power output limit.

3. A method of controlling power to the laser of a laser scanner comprising a laser outputting a pulsed laser beam and a sensor receiving reflected portions of the pulsed laser beam and outputting a signal of interest related to the strength of the received reflected portions comprising the steps of:

continually testing the signal of interest for a no-signal condition resulting from not enough light striking the sensor;

when a non-signal condition is detected, increasing power to the laser;

continually testing the signal of interest for a sensor-swamped condition resulting from too much light striking the sensor;

when a sensor swamped-condition is detected, reducing power to the laser;

continually calculating the average power output of the laser; and, outputting lower power laser pulses along with high power laser pulses as necessary to maintain a short-term average power output which is within a defined power output limit.

4. A method of controlling power to the laser of a laser scanner comprising a laser outputting a pulsed laser beam and a sensor receiving reflected portions of the pulsed laser beam and outputting a signal of interest related to the strength of the received reflected portions comprising the step of:

continuously cycling the power level of pulses comprising the pulsed laser beam between a minimum and a maximum laser operating power levels which, on-average, are not above a defined power limit.

5. A method of controlling power to the laser of a laser scanner comprising a laser outputting a pulsed laser beam and a sensor receiving reflected portions of the pulsed laser beam and outputting a signal of interest related to the strength of the received reflected portions comprising the step of:

continuously cycling the power level of pulses comprising the pulsed laser beam between a minimum laser operating power level and a maximum laser operating power level, wherein said step of continuously cycling the power level includes continuously outputting a first plurality of pulses comprising the pulsed laser beam below a defined power limit and a second plurality of pulses comprising the pulsed laser beam above the defined power limit so that, on-average, the pulsed laser beam is not above the defined power limit.

6. A method of controlling power to the laser of a laser scanner comprising a laser outputting a pulsed laser beam and a sensor receiving reflected portions of the pulsed laser beam and outputting a signal of interest related to the strength of the received reflected portions comprising the steps of:

continuously cycling the power level of pulses comprising the pulsed laser beam between a minimum laser operating power level and a maximum laser operating power level;

monitoring an average power level of pulses comprising the pulsed laser beam; and, returning the pulses to the minimum laser operating power level when the average power level reaches a defined power limit.

7. A method of controlling power to the laser of a laser scanner comprising a laser outputting a pulsed laser beam and a sensor receiving reflected portions of the pulsed laser beam and outputting a signal of interest related to the strength of the received reflected portions, comprising the steps of:

continuously cycling the power level of pulses comprising the pulsed laser beam between a minimum laser operating power level and a maximum laser operating power level;

monitoring an average power level of pulses comprising the pulsed laser beam; and, skipping pulses until the average power level is below a defined power limit when the power level of pulses being output is below the maximum laser operating power level.

* * * * *